United States Patent
Kouwenhoven et al.

(10) Patent No.: US 6,853,529 B2
(45) Date of Patent: Feb. 8, 2005

(54) SYSTEM FOR OVERVOLTAGE PROTECTION

(75) Inventors: Jacobus Theodorus Antonius Kouwenhoven, Almere (NL); Michiel Henricus Hartmann, Deventer (NL); Teunis Frans Krul, The Hague (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 10/311,158

(22) PCT Filed: Jul. 9, 2001

(86) PCT No.: PCT/EP01/07884

§ 371 (c)(1),
(2), (4) Date: Dec. 13, 2002

(87) PCT Pub. No.: WO02/09253

PCT Pub. Date: Jan. 31, 2002

(65) Prior Publication Data

US 2003/0151862 A1 Aug. 14, 2003

(30) Foreign Application Priority Data

Jul. 21, 2000 (NL) .............................................. 1015766

(51) Int. Cl.[7] ................................................ H02H 1/00
(52) U.S. Cl. ....................................... 361/117; 361/127
(58) Field of Search ............................. 361/54, 56, 57, 361/58, 111, 117, 118, 119, 126, 127, 128

(56) References Cited

U.S. PATENT DOCUMENTS 4,455,586 A * 6/1984 McCartney ................... 361/56
5,323,289 A * 6/1994 Longsdorf et al. .......... 361/111
6,157,529 A * 12/2000 Ahuja ......................... 361/111

OTHER PUBLICATIONS

Photograph of Carpaneto Turin Box, no date.

International Electrotechnical Commission, "Electrical installations of buildings—Part 5: Selection and erection of electrical equipment, Section 534: Devices for protection against overvoltages," International Standard IEC 60364-5-534, First edition, Nov. 1997, pp. 1–10.

* cited by examiner

*Primary Examiner*—Ronald Leja
(74) *Attorney, Agent, or Firm*—McDonnell Boehnen Hulbert & Berghoff LLP

(57) ABSTRACT

System for surge protection of an object comprising a supply unit, which is connected to the secondary output of an external transformer. The secondary windings (1) of the external transformer are coupled in a star configuration, the star point of the transformer being connected to a downstream neutral conductor (7) and an earth electrode provided near to the transformer. In the supply unit, at least one phase conductor (6) is connected to the neutral conductor (7) by means of a surge protective device of a first type (4), and the neutral conductor (7) is connected to an earth electrode (5) provided near to the supply unit by means of a surge protective device of a second type (9). The surge protective device of the first type (4) comprises a voltage dependent resistor or varistor and the surge protective device of the second type (9) comprises a lightning current arrester or spark gap element.

23 Claims, 2 Drawing Sheets

SYSTEM FOR OVERVOLTAGE PROTECTION

BACKGROUND OF THE INVENTION

The invention relates to a system for lightning and surge protection of objects, in which equipment is set up which has an electrical power supply. More specifically, the present invention relates to a system for surge protection of an object comprising a supply unit, which is connected to the secondary output of an external transformer, in which the secondary windings of the external transformer are coupled in a star configuration, the star point of the transformer being connected to a downstream neutral conductor and an earth electrode provided near to the transformer.

In particular, the invention may be used as a system for lightning and surge protection for an object set up on a limited area, on the ground or on a building. Examples of such an object comprise an installation provided with an antenna, e.g. a GSM base station. Surge protection devices for electrical power supplies are generally known.

The protection device according to the application may be used to protect against surges with a high energy content, such as surges caused by lightning or electromagnetic pulse (EMP). More in particular, the application relates to protection against surge caused by lightning strikes in a power supply for electrical equipment set up in objects, such as transmitter/receiver stations for radio traffic.

For such a protection device, in addition to a number of specific components and measures, one or more (preferably at least two) earth electrodes are employed for the purpose of deflecting the charge which is inherent in the surge and distributing it over the greatest possible area. It goes without saying that these earth electrodes must have the least possible resistance to the zero potential. It is, moreover, important that the ground area over which the charge of the lightning strike is to be distributed is at least of a minimum magnitude.

E.g., in the case of electrical power supplies for base stations for mobile telecommunications, such a minimum area is often not available because, for economic reasons, the area is preferably chosen to be no larger than necessary for the dimensions of the foot of the antenna mast. In the case that the object is positioned on top of a building, usually only a limited number of conductors with earth electrodes are used.

If the charge of a lightning or of EMP strikes the cabinet in which the power supply is housed or the metal frame to which the cabinet is attached, there is a danger of parasitic flash-over of the charge to the electrical conductors of the power supply. Since this charge is dissipated relatively poorly, the voltage in the power supply can rise to such an extent that flash-over can damage the components of the power supply, such as switches or cause failures of the power supply. Also, other equipment of the object, such as the equipment being supplied with power may be damaged.

That this voltage can be substantial can be understood from the fact that from a direct lightning strike a peak current of as much as 150 kA may arise, which must be deflected via an earth electrode having an impedance of 2.5 Ohm (this value being a standard value for earth electrodes, in practice this value may be higher or lower).

Momentarily, this may lead to voltages of over 100 kV. For such a peak voltage, a power supply for low voltage applications is not equipped.

Such a parasitic flash-over is prevented according to the state of the art by connecting surge protective devices, such as varistors or spark gaps, between the frame and each of the phases and between the frame and each of the neutral conductor of the power supply. The frame is connected directly to an earth connection, such as one or more earth electrodes. This way, parasitic flash-over from the part on which the strike occurs to one of the conductors is prevented.

In this known solution, however, it can not be prevented that in the power supply substantial damage occurs when a direct lightning strike occurs on the frame, which will be further explained in the detailed description. Here, it suffices to mention that this damage may comprise the burning of one or more components of the power supply caused by the very large currents. Moreover, mechanical damage may arise in the power supply as the large currents flowing through the conductors of each of the phase conductors and of the neutral conductor cause the connecting conductors to be pulled from the connection points, through the electromagnetic fields caused by the large currents, as a result of which an interruption in the current flow occurs.

It need not be mentioned that, also because of the earlier mentioned periphery arrangement of the power supply and the less proper accessibility thereof, repair of the damage will take a lot of time. As a result, the installation powered by the power supply will be out of service for a longer period of time, which leads to a higher risk of operational damage.

European patent application EP-A-0 128 344 describes an arrangement for surge arresters in a high voltage transformer. In this arrangement, surge arresters are connected between each phase conductor and the neutral conductor, and also between the neutral conductor and an earth electrode. The surge arresters are all of the same type. Additionally, a capacitor is connected between the neutral conductor and a second earth electrode. This results in a protection of the transformer against too high voltage peaks, in which the capacitor controls the dynamic behavior of the surge arresters. The surge arresters are usually chosen to be spark gap elements, as these can be used in high voltage applications. The arrangement described is meant specifically for protection of the high voltage transformer.

A disadvantage of the use of spark gap elements or spark gaps connected between the phase conductors and the neutral conductor is that a rest voltage results which is poorly defined and usually too large. Furthermore, spark gaps will keep an undefined rest voltage, dependent on the rise time of the lightning pulse, which may be 2.5 to 4 kV, which is too high for low voltage equipment. Also, the spark gap elements cause a short circuit and thus a net following current, which almost certainly results in breakdown of the fuses (of the electricity provider). Breakdown of the fuses results in operational down time of the equipment supplied by the transformer.

The present invention seeks to provide a system for surge protection for use in low voltage applications, which does not have the disadvantages of the known systems described above. The present invention also seeks to provide a solution to the problem that the power supply defined in the preamble above, has such a limited deflection path to earth in order to deflect the charge of the strike, that the peak voltage occurring is relatively high and decreases relatively slowly.

SUMMARY OF THE INVENTION

According to the present invention, a system for surge protection is provided, in which in the supply unit at least one phase conductor is connected to the neutral conductor by means of a surge protective device of a first type, and the neutral conductor is connected to an earth electrode provided near to the supply unit by means of a surge protective device of a second type.

The surge protective device of the first type is primarily meant to provide a well defined safety level (maximum voltage over its connection leads) and the surge protection device of the second type is primarily meant to arrest or deflect high currents.

By using different types of surge arresters between the phase conductors and the neutral conductor and between the neutral conductor and the earth electrode, the system provides a very efficient surge protection, e.g. caused by lightning strike on an object. The solution of the present invention has as one insight whereon the invention is based that the frontal edge of the lightning current flows through the earth electrodes and the other components of the lightning current flow through the connected conductors (i.e. the supply conductors and other conductors). It is believed that this phenomenon occurs because of the limited ground surface to which the earth electrode is connected. The neutral conductor between the power supply unit and transformer to which the power supply unit is connected, is not connected to a self-induction while the phase conductors are connected to a self-induction. The self-induction may be a transformer coil or winding, or a coil of a kilo-watt hour meter. This causes that the current through the neutral conductor will be larger than the current through the phase conductors.

The surge protective device of the first type may be a voltage dependent resistor, or varistor. The resistance value of such an element abruptly decreases when the voltage over the element passes a preset voltage value. The surge protective device of the second type may be a spark gap element, or spark gap. These elements cause a discharge to occur when the voltage across its terminals increases above a preset value, and are usually applied when high voltages are to be expected.

The surge protective devices of the first type ascertain that smaller currents flow through the phase conductors while also ascertaining that too high a voltage on the phase conductors is limited to a well defined value. Furthermore, the surge protective device of the second type ascertains that the large lightning current flows via the element into the neutral conductor which is not provided with a fuse.

In an embodiment of the present invention, the surge protective device of the first type and surge protective device of the second type are included in front of a switch provided in the supply unit, seen in the direction of power flow from the external transformer. This arrangement assures that the currents caused by a lightning strike or EMP do not flow through the switch of the system, resulting in a better protection of one of the elements of the power supply. In former actual cases of damage caused by lightning strike, the switch was completely burnt.

In a further embodiment, in at least one phase conductor a decoupling impedance is provided and, seen in the direction of power flow from the external transformer, at least one phase conductor is connected to the neutral conductor between an input of the supply unit and the decoupling impedance by means of a further surge protective device of the second type, and the part of the phase conductor behind the decoupling impedance is connected to the neutral conductor by means of a further surge protective device of the second type.

The decoupling impedance assures a proper control of the various surge protective devices. It assures that the varistor will engage firstly, assuring a controllable safety level. The current through the decoupling impedance will build a voltage, which will at the right moment engage the surge protection device of the second type, which can deflect a larger lightning current. As a result, this embodiment allows to arrest higher lightning currents through the phase conductors.

In a further embodiment of the present system, the switch may be switched off by means of an earth leakage circuit breaker. The earth leakage circuit breaker is also protected by the present system. Earth leakage circuit breakers are applied in general for high impedance earth circuits. In a normal arrangement (surge arresters between phase and earth) a defect in one of the surge arresters can lead to too high voltage of the high impedance earth, and thus also for the connected equipment. The normal protection system can thus only be used after the earth leakage circuit breaker, in order to disconnect such an unwanted situation, and as a result, the earth leakage circuit breaker may still be damaged when a lightning strikes. The present invention, however, may be positioned in front of the earth leakage circuit breaker, as by using a spark gap, no galvanic connection is present between the neutral conductor and earth. As a result, the earth (and all connected equipment) can not be put on too high a voltage when one of the surge arresters fails.

In a further embodiment, the earth leakage circuit breaker is of a self-resetting type. Such an earth leakage circuit breaker will reset after a predetermined period of time, thus reconnecting the power supply automatically. When there still is an earth failure, the earth leakage circuit breaker will switch off again.

In an even further embodiment, the surge protective device of the second type is of the non blowing-off type. Preferably, the surge protective device of the first type comprises a voltage dependent resistor or varistor and the surge protective device of the second type comprises a lightning current arrester or spark gap element. This arrangement assures that no hot gasses or high pressure occur, which are typical for state of the art spark gap elements which are blowing off.

In a further embodiment, the elements of the power supply unit are positioned inside a closed cabinet. This allows to build a small and reliable cabinet comprising the elements of the power supply (i.e. power supply connections and the protection circuitry), which is moreover cost-effective and easy to assemble. By using surge protective devices of the non blowing-off type, the cabinet will not be exposed to high internal pressures or hot gasses. This also has the added advantage that the connection between neutral conductor and surge protective device may be a short connection, which results in less mechanical forces on the connections caused by strong electromagnetic fields.

In a further aspect, the present invention relates to a system for surge protection of an object comprising a supply unit, which is connected to the secondary output of an external transformer, in which the secondary windings of the external transformer are coupled in a star configuration, the star point of the transformer being connected to a downstream neutral conductor and an earth electrode provided near to the transformer. In the supply unit at least one phase conductor is connected to the neutral conductor by means of a surge protective device of a first type, and the neutral conductor is connected to an earth electrode provided near to the supply unit by means of a surge protective device of a second type, in which the surge protective device of the second type has a rating of at least 40 kA, more preferably at least 50 kA and even more preferably at least 100 kA. This will allow an effective surge protection system offering protection to currents which have been encountered in practise after lightning strikes on objects with a small foot print.

The surge protective device of the first type has a rating of at least 4 kA, more preferably at least 8 kA. This will suffice for the currents flowing through these elements occurring after a lightning strike.

In a further embodiment, the neutral conductors of the system and the interconnections between the neutral conductors have a diameter of at least 8 mm$^2$, more preferably at least 16 mm$^2$. Also the conductors connected to the earth electrodes and all interconnecting items have a diameter of at least 8 mm$^2$, more preferably at least 16 mm$^2$. This should include all connections through which current flows, including interconnections of clamps to which the neutral conductors or earth conductors are connected. The highest currents will flow through the neutral conductors and to the earth electrodes, and as a result the complete path through which these currents flow should have a predetermined minimal diameter. Preferably, at least part of the conductors connected to the earth electrode is formed by a metal plate. This allows an effective flow of the current over the neutral and earth conductors leading to lower electromechanical forces.

SHORT DESCRIPTION OF THE DRAWING

The invention will now be explained in further detail referring to the drawing, in which.

DETAILED DESCRIPTION OF AN EMBODIMENT

Figure 1:
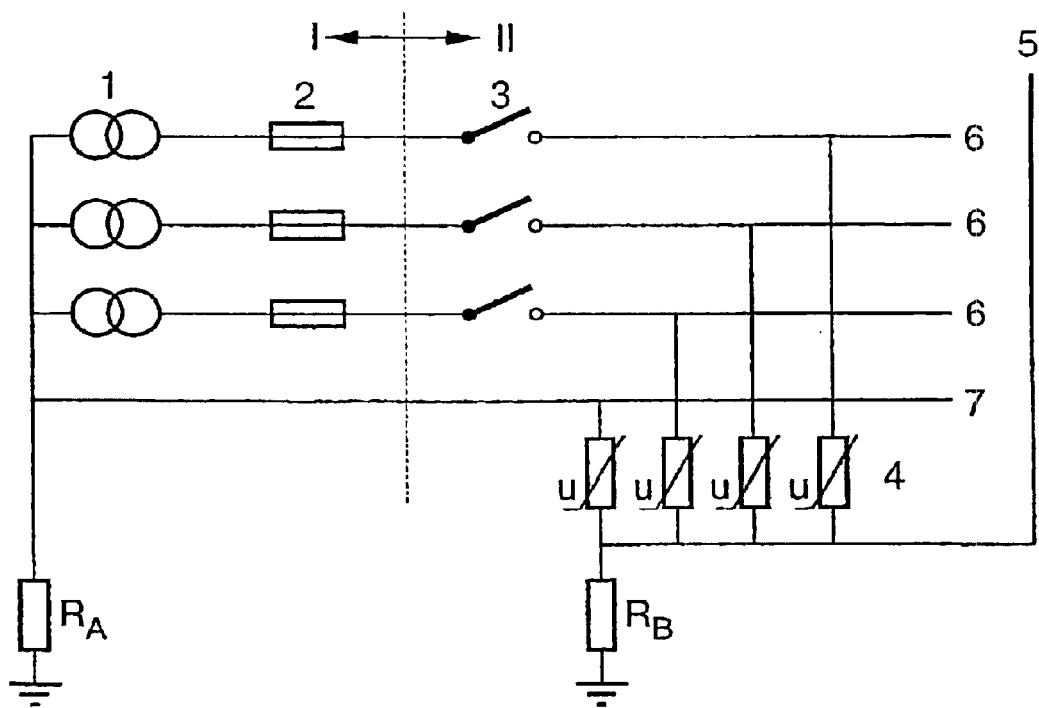
FIG. 1 shows a schematic diagram of a system for protection of low voltage equipment according to the prior art.

In FIG. 1, which shows the state of the art, I indicates the part which is positioned in the space of the electricity supplier. Three windings of a transformer are referenced by numeral 1, the secondary winding of the transformer being in a star configuration of which the star point is earthed. The impedance existing between the star point and the point of the zero potential is indicated by Ra, which usually has a very low value, e.g. a 0.5 Ohm and a self inductance of e.g. 5 $\mu$H. The secondary windings of the transformer usually have a resistance value of about 0.01 Ω and a self inductance of 50 $\mu$H. In this space, also the fuses 2 are positioned.

The equipment of the user, in the part indicated with II, comprises a three phase switch 3. Each of the conductors (phase and neutral) is connected behind the switch 3 to a connection 5 via a surge arrester 4, such as a voltage dependent resistor or varistor. The connection 5 is connected to the frame of the switch closet (or object). This connection 5 is being earthed by means of a earth conductor, the impedance of which is Rb. The conductors leading away from the switch 3, which supply the further equipment with energy, are indicated with reference numeral 6 for the phase conductors and reference numeral 7 for the neutral conductor. The further equipment is provided with possible own protection and has a relatively high input impedance.

When a lightning strike hits the frame of the object, the charge must be deflected via the earth conductor 5 to earth. In an ideal case, the impedance Rb, via which the lightning energy is deflected, has a zero value. Standardisation norms for lightning protection require a value of maximum 2.5 Ohm.

A limiting factor for the deflection of the energy caused by the lightning strike is the small ground surface on which the object (or equipment) is usually positioned. The small dimensions of the ground surface prevent a quick deflection of a large amount of charge within a short time period. This substantially enhances the chance of heating of the equipment in the object II and also the risk of voltage flash-over.

In a lightning strike in which a momentary value of the current may be as high as 150 kA, a voltage on the earth conductor 5 may be as high as 75 kV. This voltage may easily flash over to the switch 3, which in normal operation is closed. In almost all situations, such a flash-over will cause severe damage of the switch 3 and often to melting of the fuses 2.

In order to keep the peak voltage as low as possible and to limit the time period as much as possible, surge arresters 4, such as voltage dependent resistors are provided. The largest current will usually flow through the neutral conductor 7, as this has the lowest impedance value.

At a lightning strike on the frame, the resistors 4 will decrease the danger of flash surge to the fuses 2 and switch 3, but the large currents that will flow from part II to part I (of the electricity supplier) will still have values which may be substantially higher than 40 kA, as a result of which still burning phenomena will occur on the fuses 2 and switch 3.

As a result of the arrangement of the object II, this may lead to a prolonged period of time in which the object II is not operational, which disturbs the service supplied by the equipment in an economically non-attractive fashion.

Figure 2:
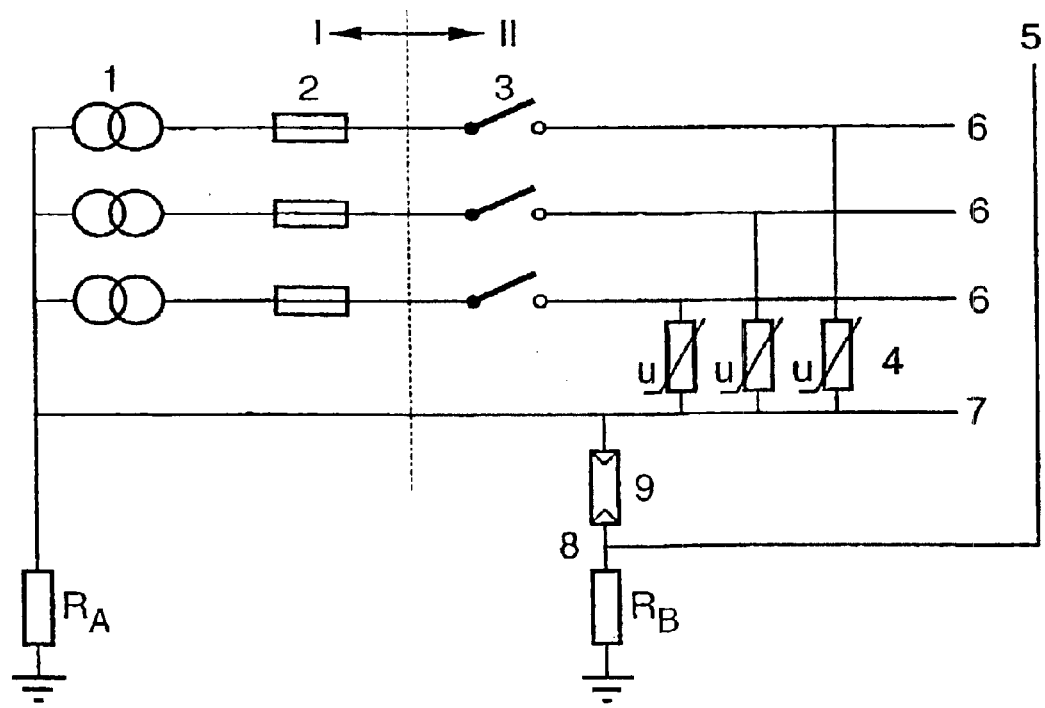
FIG. 2 shows a schematic diagram of a first embodiment of a system according to the invention.

The circuit according to FIG. 2 provides a solution to this problem in accordance with the present invention. The voltage dependent resistors 4, which are on one side connected with the phase conductors 6, are not connected on the other side to the earth conductor 5, but with the neutral conductor 7. The neutral conductor 7 now connects the lightning current arrester 9 with the earth conductor 5.

Such a lightning current arrester, which at flash-over causes a short circuit situation of limited time duration, is known in the art (see e.g. German patent applications DE-A-19 74 2302 and DE-A-19 75 5082 and European patent application EP-A-0 128 344 mentioned in the introduction).

When a lightning strikes the frame of the object II, the peak voltage on the phase conductors 6 will now be largely suppressed by the voltage dependent resistors 4. The lightning current arrester 9 will cause an almost complete short circuit between the neutral conductor 7 and the earth conductor 8, resulting in that the current caused by the strike is only partially deflected from the object II to the transformer in part I via the phase conductors 6.

The peak current to be deflected, will now be deflected via the parallel circuit of the earth resistances Ra and Rb. Of course, the resistance of the phase conductors 6 and the neutral conductor 7 between the object II and the transformer in part I still plays a role, but in practical situations this connection will not result in problems because of the low impedance.

Figure 3:
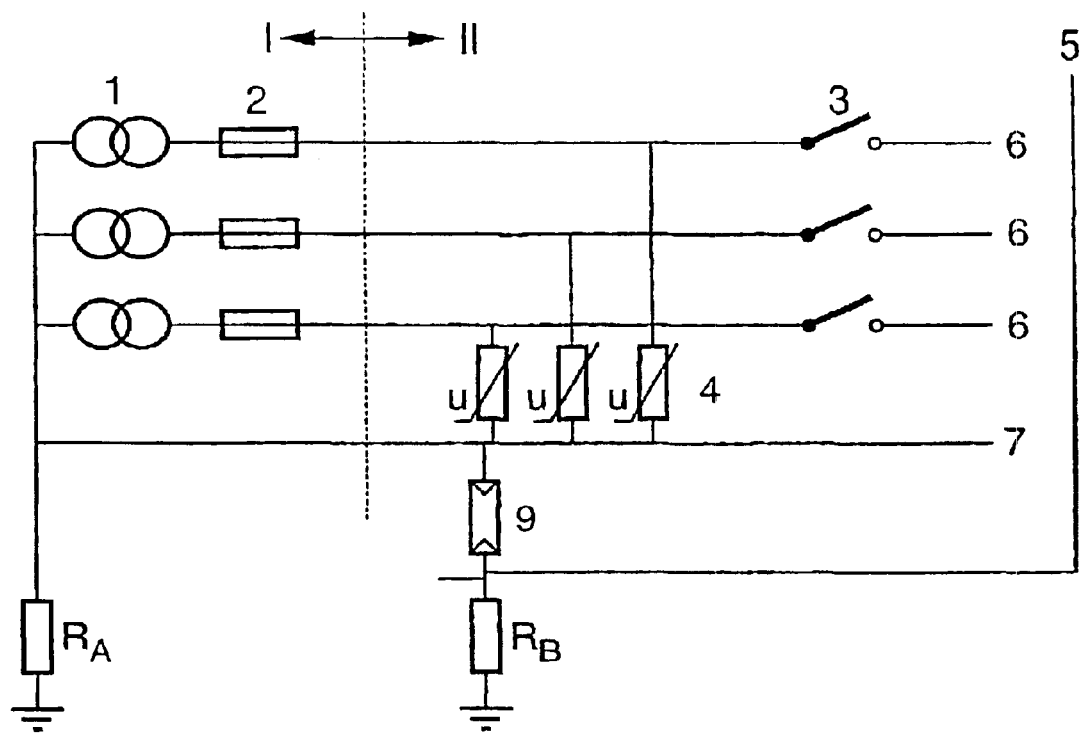
FIG. 3 shows a schematic diagram of a second embodiment of a system according to the invention.

FIG. 3 shows a further embodiment of the system according to the present invention, in which the switch 3, viewed in the direction of power flow to the equipment in part II, is positioned behind the components for current and voltage suppression. This further reduces the risk of overload of the switch 3 by large currents. The only components in the system upward of the protection system are the fuses 2 of the electricity provider. Although tests have shown that the lightning induced currents through the phase conductors 6 are relatively small, it may still occur that the fuses 2 break down. To assure that down time due to blown fuses 2 is minimised, it is preferred that the fuses 2 are of the automatic type, as these can better withstand the lightning induced currents than fuses 2 of the melting type. Moreover, the fuses 2 of the automatic type can be reset manually, or form a remote location.

Figure 4:
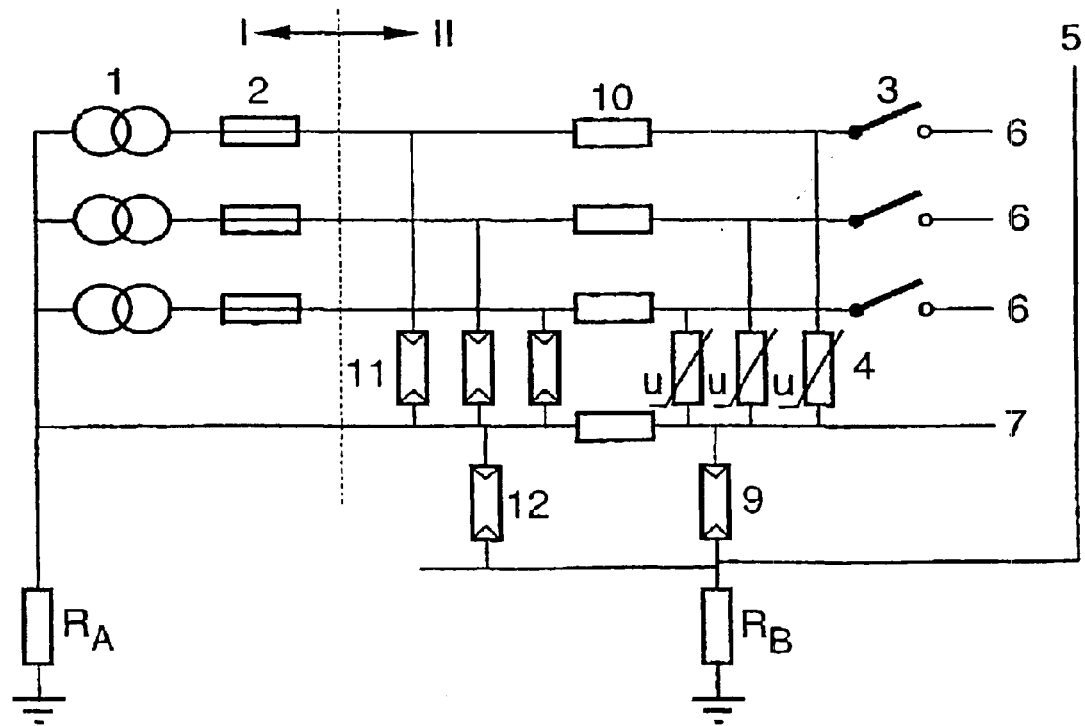
FIG. 4 shows a schematic diagram of a third embodiment of a system according to the invention.

FIG. 4 shows an even further embodiment of the system according to the present invention. In this circuit arrangement, a decoupling impedance 10 is provided in each of the phase conductors 6 between the point where the phase conductor 6 is connected to the neutral conductor 7 by means of a surge protective device 4 and the connection to the switch 3. Furthermore, additional surge protective devices 11 are provided between each of the phase conductors 6 and the neutral conductor 7 as well as an additional surge protective device 12 between the neutral conductor 7 and the earth conductor 5. The additional surge protective devices 11, 12 are preferably current arresters such as spark gap elements. The decoupling impedances 10 assure a proper control of the various surge protective devices 4, 9, 11, 12. It assures that the varistors 4 will engage firstly, assuring a controllable safety level. The current through the decoupling impedance will build a voltage, which will at the right moment engage the surge protection device 11 of the second type which can deflect a larger lightning current. As a result, this embodiment allows to arrest higher lightning currents through the phase conductors. The system of FIG. 4 will effectively protect both the equipment being supplied by the power supply unit and the transformer 1 in the provider space I. It will be apparent to the person skilled in the art that the arrangement of decoupling impedances 10 and surge protection devices 4, 9, 11, 12 can also be positioned downstream of the switch 3.

The surge protective devices 9, 11, 12 of the second type have a rating of at least 40 kA, more preferably at least 50 kA and even more preferably at least 100 kA. This will allow an effective surge protection system offering protection to currents which have been encountered in practise when lightning strikes on objects with a small foot print. The surge protective devices 4 of the first type has a rating of at least 4 kA, more preferably at least 8 kA. This will suffice for the currents flowing through these elements occurring after a lightning strike.

All elements of the embodiments described above, may be integrated into a single cabinet. Using surge protection devices 9, 11, 12 of a non blowing-off type will allow to also integrate these elements in the cabinet, as no hot gasses or high pressures can occur. To be able to withstand the high currents flowing through them, the neutral conductor 7 and/or earth conductor 5 of the system and the interconnections between them (such as clamps, etc.) are all made of a material having a diameter of at least 8 $mm^2$, and more preferably at least 16 $mm^2$. This should include all connections through which current flows, including interconnections of clamps to which the neutral conductor 7 and/or earth conductor 5 are connected. The highest currents will flow through the neutral conductor 7 and earth conductor 5, and as a result the complete path through which these currents flow should have a predetermined minimal diameter. Preferably, at least part of the earth conductor 5 is formed by a metal plate. This allows an effective flow of the current over the earth conductor 5 leading to lower electromechanical forces. Also, the connections to the earth electrodes (towards Ra and Rb in FIGS. 2, 3 and 4) should have a minimum diameter. In the closed cabinet, special attention should be given to the mounting of the lightning current arrester 9, as the highest currents will flow through this element when a lightning strikes. These currents may cause large electromagnetic forces, which may damage the mounting of the element 9.

It is evident that the effect according to the present invention will also occur when the incoming conductors are connected to a kilowatt-hour meter present in the space indicated by roman numeral I.

It will also be clear that the solution according to the present invention is also usable for a single phase power supply.

What is claimed is:

1. System for surge protection of an object, the system comprising a supply unit comprising at least one phase conductor (6) connected to a neutral conductor (7) via a surge protective device of a first type (4), wherein the neutral conductor (7) is connected to an earth electrode (5) of the object via a surge protective device of a second type (9), the surge protective device of the first type (4) comprising a voltage dependent resistor with a rating of at least approximately 4 kA and the surge protective device of the second type (9) comprising a lightning current arrester having a rating of at least approximately 40 kA.

2. System according to claim 1, in which the surge protective device of the first type (4) and surge protective device of the second type (9) are included in front of a switch (3) provided in the supply unit, seen in the direction of power flow from an external transformer (1) of which the secondary output is connected to the supply unit.

3. System according to claim 2, in which the switch (3) may be switched off by means of an earth leakage circuit breaker.

4. System according to claim 3, in which the earth leakage circuit breaker is of a self-resetting type.

5. System according to claim 1, in which the surge protective device of the second type (9) is non blowing-off.

6. System according to claim 1, in which the surge protective device of a first type (4) and the surge protective device of a second type (9) are positioned inside a single cabinet.

7. System according to claim 1, in which the surge protective device of the second type (9) has a rating of at least approximately 50 kA, and wherein the surge protective device of the first type (4) has a rating of at least approximately 8 kA.

8. System according to claim 7, in which the conductors connected to the earth electrodes (5) of the system has a cross-section of at least approximately 8 $mm^2$.

9. System according to claim 7, in which the conductors connected to the earth electrodes (5) of the system has a cross-section of at least 16 $mm^2$.

10. System according to claim 1, in which the surge protective device of the second type (9) has a rating at least approximately 100 kA and wherein the surge protective device of the first type (4) has a rating of at least approximately 8 kA.

11. System according to claim 1, in which the neutral conductor (7) of the system has a cross-section of at least approximately 8 mm².

12. System according to claim 1, in which the neutral conductor (7) of the system has a cross-section of at least approximately 16 mm².

13. System according to claim 1, in which at least a portion of the earth conductor (5) is formed by a metal plate.

14. System according to claim 7, in which
the surge protective device of the first type (4) and surge protective device of the second type (9) are included in front of a switch (3) provided in the supply unit,
seen in the direction of power flow from an external transformer (1) of which the secondary output is connected to the supply unit.

15. System for surge protection of an object, the system comprising
a supply unit comprising at least one phase conductor (6) connected to a neutral conductor (7) via a surge protective device of a first type (4),
wherein the neutral conductor (7) is connected to an earth electrode (5) of the object by means of a surge protective device of a second type (9),
the surge protective device of the first type (4) comprises a voltage dependent resistor with a rating of at least approximately 4 kA and
the surge protective device of the second type (9) comprises a lightning current arrester with a rating of at least approximately 40 kA,
the at least one phase conductor (6) further comprising a decoupling impedance (10) and in which, seen in the direction of power flow from an external transformer (1), the at least one phase conductor (6) is connected to the neutral conductor (7) between an input of the supply unit and the decoupling impedance (10) by means of a further surge protective device of a second is type (ll).

16. System according to claim 15, in which a switch (3) maybe switched off by means of an earth leakage circuit breaker.

17. System according to claim 16, in which the earth leakage circuit breaker is of a self-resetting type.

18. System according to claim 16, in which the surge protective device of the second type (9) is non blowing-off.

19. System according to claim 18, in which the elements of the power supply unit are positioned inside a closed cabinet.

20. System according to claim 16, in which the further surge protective device of the second type (11) is non blowing-off.

21. System for surge protection of an object, the system comprising
a supply unit comprising at least one phase conductor (6) connected to a neutral conductor (7) by means of a surge protective device of a first type (4),
and wherein the neutral conductor (7) is connected to an earth electrode (5) of the object by means of a surge protective device of a second type (9), characterized
in that the surge protective device of the first type (4) comprises a voltage dependent resistor with a rating of at least 4 kA and
the surge protective device of the second type (9) comprises a lightning current arrester which has a rating of at least 40 kA,
wherein the at least one phase conductor (6) and a decoupling impedance (10) is provided and in which, seen in the direction of power flow from an external transformer (1),
the at least one phase conductor (6) connected to the neutral conductor (7) between an input of the supply unit and the decoupling impedance (10) by means of a second surge protective device of the second type (11), and
in which a portion of the phase conductor (6) residing behind the decoupling impedance (10) is connected to the neutral conductor (7) by means of a third surge protective device of the second type (12).

22. System according to claim 21, in which the second surge protective device of the second type (11) is non blowing-off.

23. System according to claim 21, in which the third surge protective device of the second type (12) is non blowing-off.

* * * * *